US006967569B2

(12) United States Patent
Weber et al.

(10) Patent No.: US 6,967,569 B2
(45) Date of Patent: Nov. 22, 2005

(54) ACTIVE NIGHT VISION WITH ADAPTIVE IMAGING

(75) Inventors: Willes H. Weber, Ann Arbor, MI (US); Timothy Potter, Dearborn, MI (US); Aric Shaffer, Ypsilanti, MI (US)

(73) Assignee: Ford Global Technologies LLC, Dearborn, MI (US)

( * ) Notice: Subject to any disclaimer, the term of this patent is extended or adjusted under 35 U.S.C. 154(b) by 91 days.

(21) Appl. No.: 10/605,783

(22) Filed: Oct. 27, 2003

(65) Prior Publication Data

US 2005/0206510 A1 Sep. 22, 2005

(51) Int. Cl.[7] ........................ B60Q 1/00
(52) U.S. Cl. ........................ 340/436; 340/435; 340/555; 340/556; 340/557; 340/561; 340/903; 348/148
(58) Field of Search ........................ 340/436, 435, 340/461, 425.5, 438, 903, 555–557, 561; 348/115, 148, 118, 154; 180/271; 701/300, 701/301; 359/615, 630, 462; 250/205, 222.1, 250/559.12, 559.13; 362/459, 487, 507, 538

(56) References Cited

U.S. PATENT DOCUMENTS

| | | | | |
|---|---|---|---|---|
| 6,420,704 | B1 * | 7/2002 | Berenz et al. | 250/330 |
| 6,815,680 | B2 * | 11/2004 | Kormos | 250/330 |
| 2002/0075387 | A1 | 6/2002 | Janssen | |

* cited by examiner

*Primary Examiner*—Davetta W. Goins
(74) *Attorney, Agent, or Firm*—Frank A. MacKenzie

(57) ABSTRACT

A vision system for a vehicle includes a light source generating an illumination beam, a receiver having a pixel array for capturing an image in response to at least a reflected portion of the illumination beam, the image corresponding to a first horizontal field of view (FOV) angle, and a controller coupled to the light source and the receiver. The controller receives a vehicle speed input and, in response, selects a portion of the image as a non-linear function of the vehicle speed to generate a second horizontal FOV angle for displaying to the vehicle operator. The displayed angular FOV decreases, non-linearly, as the vehicle speed increases.

19 Claims, 6 Drawing Sheets

ACTIVE NIGHT VISION WITH ADAPTIVE IMAGING

BACKGROUND OF INVENTION

The present invention relates to night vision systems. More particularly, the present invention is related to an active night vision system with adaptive imaging.

Night vision systems allow a vehicle occupant to better see objects during relatively low visible light level conditions, such as at nighttime. Night vision systems typically are classified as either passive night vision systems or active night vision systems. Passive systems simply detect ambient infrared light emitted from the objects within a particular environment. Active systems utilize a near infrared (NIR) light source to illuminate a target area and subsequently detect the NIR light reflected off objects within that area.

Passive systems typically use far-infrared cameras that are characterized by low resolution and relatively low contrast. Such cameras must be located on the vehicle exterior in order to acquire requisite infrared energy in the operating environment. Externally mounted cameras can negatively affect vehicle styling. Far-infrared cameras are also costly to manufacture and generate non-intuitive images that can be difficult to interpret.

Active systems provide improved resolution and image clarity over passive systems. Active systems utilize laser or incandescent light sources to generate an illumination beam in the near infrared spectral region and charge-coupled devices or CMOS cameras to detect the reflected NIR light.

Diode lasers are preferred over incandescent light sources for several reasons. Incandescent light sources are not monochromatic like diode lasers, but instead emit energy across a large spectrum, which must be filtered to prevent glare onto oncoming vehicles. Filtering a significant portion of the energy generated from a bulb is expensive, energy inefficient, and generates undesired heat. Also, filter positioning is limited in incandescent applications, since the filter must be located proximate an associated light source. As well, multiple incandescent sources are often required to provide requisite illumination, thus increasing complexity and costs.

In an exemplary active night vision system a NIR laser is used to illuminate a target area. A camera is used in conjunction with the laser to receive reflected NIR light from objects within the target area. The laser may be pulsed with a duty cycle of approximately 25–30%. The camera may be operated in synchronization with the laser to capture an image while the laser is in an "ON" state.

The camera typically contains a band-pass filter that allows passage of light that is within a narrow range or band, which includes the wavelength of the light generated by the laser. The combination of the duty cycle and the use of the band-pass filter effectively eliminates the blinding effects associated with headlamps of oncoming vehicles. The term "blinding effects" refers to when pixel intensities are high due to the brightness of the oncoming lights, which causes an image to be "flooded out" or have large bright spots such that the image is unclear.

Most active night vision systems employ a fixed field of view presented to the vehicle operator. If the field of view is set too wide, it makes identifying distant objects difficult, particularly at high speeds. If it is set too narrow, it can lack appropriate coverage at low vehicle speeds or while turning the vehicle. Thus, most variable field of view display systems employ a mechanical zoom control on the camera lens, or a mechanical steering mechanism to point the system in the region of interest. Such mechanical controls, however, increase system complexity and, resultantly, system cost and potential warranty claims.

Thus, there exists a need for an improved active night vision system and method of generating images that provides an adaptive field of view related to vehicle speed or direction.

SUMMARY OF INVENTION

The present invention provides a vision system for a vehicle. The vision system includes a light source that generates an illumination beam. A fixed receiver having an associated pixel array generates a first image signal in response to a reflected portion of the illumination beam. A controller is coupled to the light source and the receiver. The controller generates an image for display comprising a portion of the pixel array, the portion of the array being determined as a function of the vehicle speed and/or direction.

In one embodiment, a vision system for a vehicle is provided. The system includes a light source generating an illumination beam, a receiver having a pixel array for capturing an image in response to at least a reflected portion of the illumination beam, the image corresponding to a first horizontal field of view (FOV) angle, and a controller coupled to the light source and the receiver. The controller receives a vehicle speed input and, in response, selects a portion of the image as a non-linear function of the vehicle speed to generate a second horizontal FOV angle for displaying to the vehicle operator. The displayed angular FOV decreases, non-linearly, as the vehicle speed increases. In another example, a low speed (LS) and high-speed (HS) threshold are used to maintain the displayed angular field of view to a constant wide angle below the LS threshold and a constant narrow angle above the HS threshold.

In another example, an active night vision system for a vehicle includes a light source generating an illumination beam, vehicle sensors for indicating first and second vehicle operating parameters, a receiver having a pixel array for capturing an image in response to at least a reflected portion of the illumination beam, the image corresponding to a first horizontal field of view (FOV) angle, and a controller coupled to the light source, the receiver and the vehicle sensors. The controller selects a portion of the image as a non-linear function of the first vehicle operating parameter and the second vehicle operating parameter to generate a second horizontal FOV angle for displaying to the vehicle operator. The first parameter can be vehicle speed and the second is vehicle directional change or anticipated directional change.

The embodiments of the present invention provide several advantages. One advantage that is provided by several embodiments of the present invention is the provision of utilizing a single fixed receiver to generate adaptive image signals. In so doing the present invention minimizes system costs and complexity. In this regard, the present invention provides an active night vision system that is inexpensive, versatile, and robust.

The present invention itself, together with further objects and attendant advantages, will be best understood by reference to the following detailed description, taken in conjunction with the accompanying drawing.

BRIEF DESCRIPTION OF DRAWINGS

For a more complete understanding of this invention reference should now be had to the embodiments illustrated in greater detail in the accompanying figures and described below by way of examples of the invention wherein.

DETAILED DESCRIPTION

Figure 1:
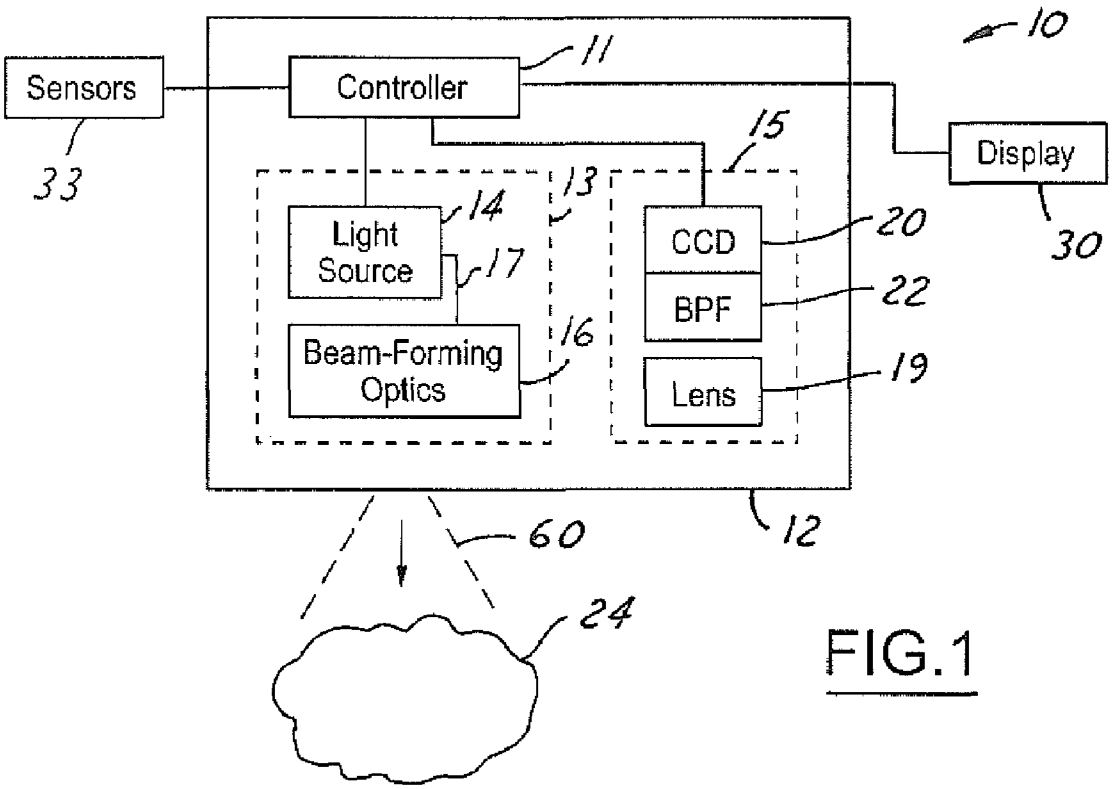
FIG. 1 is a schematic block diagram of an active night vision system in accordance with an embodiment of the present invention.

In the following figures the same reference numerals will be used to refer to the same components. While the present invention is described with respect to an adaptive imaging active night vision system, the present invention may be applied in various applications where near infrared imaging is desired, such as in adaptive cruise control applications, in collision avoidance and countermeasure systems, and in image processing systems. The present invention may be applied in various types and styles of vehicles as well as in non-vehicle applications.

In the following description, various operating parameters and components are described for one constructed embodiment. These specific parameters and components are included as examples and are not meant to be limiting.

Additionally, in the following description the term "near infrared light" refers to light having wavelengths within the 750 to 1000 nm spectral region. The term also at least includes the spectrum of light output by the particular laser diode source disclosed herein.

Figure 2:
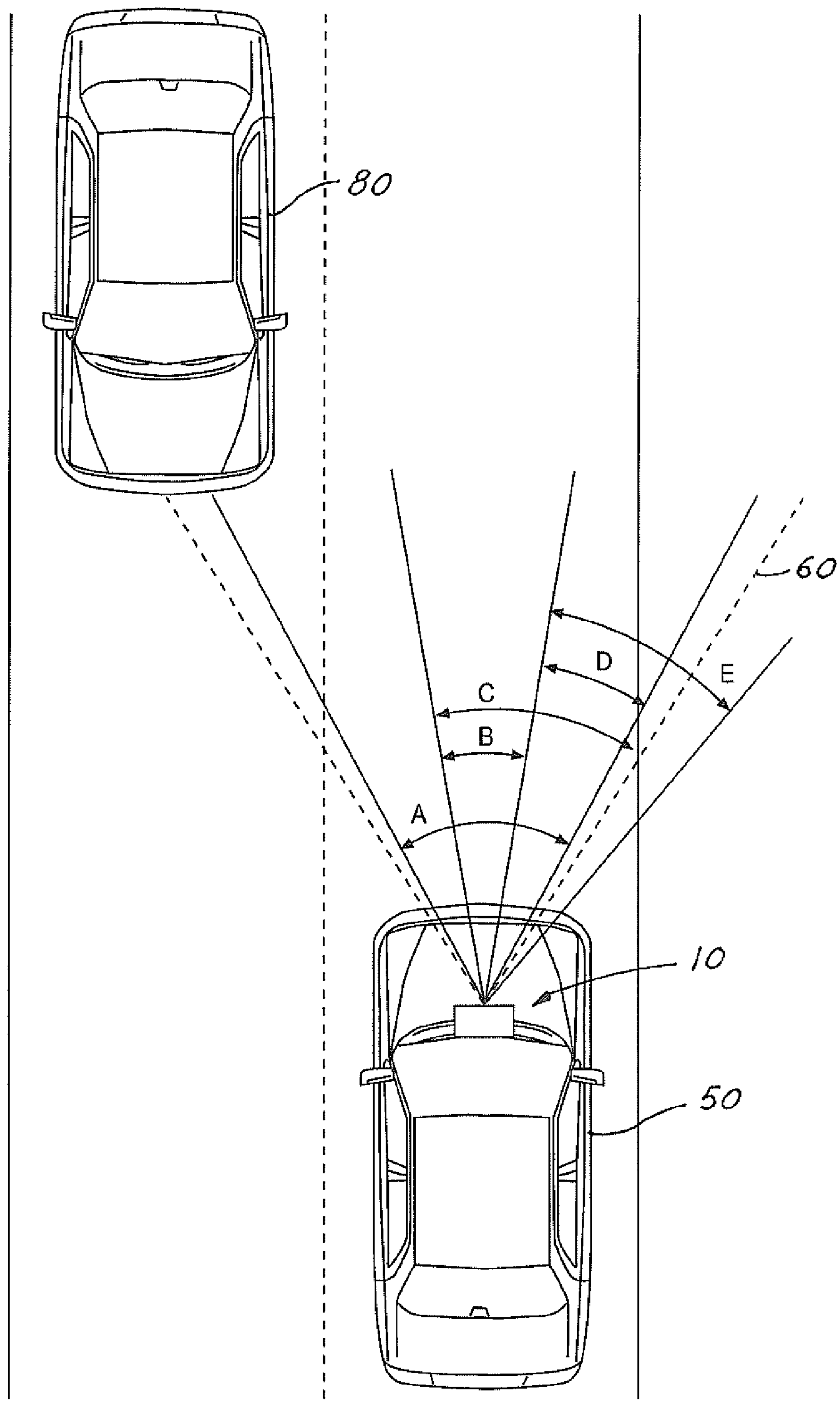
FIG. 2 is a top perspective view of the active night vision system in accordance with an embodiment of the present invention.

FIGS. 1 and 2 illustrate a night vision system 10 for detecting objects at relatively low visibility light levels. The system 10 may be utilized in a plurality of applications. For example, the system 10 may be used in an automotive vehicle 50 to allow a driver to see objects at night that would not be otherwise visible to the naked eye. As illustrated, the system 10 includes a controller 11, an illumination system 13, and a receiver 15. Several of the system components may be included within a housing 12. It should be understood, however, that the components of system 10 containing housing 12 could be disposed at different locations within the vehicle 50 wherein the housing 12 would not be needed. For example, the components of the system 10 could be disposed at different operative locations in the automotive vehicle so that a single housing 12 would be unnecessary. Housing 12 is provided to enclose and protect the various components of the system 10. Housing 12 may be constructed from a plurality of materials including metals and plastics.

The illumination system 13 can be configured to be mounted within an overhead console above a rearview mirror within the vehicle 50, and the receiver system 15 can be configured to be mounted forward of the driver's seat on a dashboard. Of course, the illumination system 13 and the receiver system 15 may be mounted in other locations around the windshield as well as other window and non-window locations within the vehicle 50.

As will be discussed in more detail below, the system 10 may be used to detect any reflective object, such as object 24, in operative proximity to the system 10. The system, however, is particularly suited to detecting and displaying to the vehicle operator several objects at varying distances.

The controller 11 is preferably a microprocessor-based controller including drive electronics for the illumination system 13 and receiver 15, and image processing logic for the display system 30. Alternatively, display unit 30 may include its own respective control logic for generating and rendering image data. Separate controllers for the illumination system 13 and receiver 15 are also contemplated but, for simplicity, only controller 11 is shown.

The illumination system 13 includes a light source 14 that generates light, which may be emitted from the system in the form of an illumination beam, such as beam 60. Light generated from the light source 14 is directed through an optic assembly 16 where it is collimated to generate the illumination beam 60. The illumination beam 60 is emitted from the light assembly 13 and, for example, passed through the windshield.

In the example of FIG. 1, the illumination subsystem 13 includes a NIR light source 14, beam-forming optics 16, and a coupler 17 between the two. In one embodiment, the light source is a NIR diode laser; the beam forming optics comprise a thin-sheet optical element followed by a holographic diffuser, whose combined purpose is to form a beam pattern in the direction of arrow A comparable to the high-beam pattern used for normal vehicle headlamps; and the coupler between them is a fiber-optic cable. The light coupler can be omitted if the light source 14 has direct emission into the optics 16. Also, the light coupler can comprise a mirror or series of mirrors or other reflective or light transporting device known in the art. The illumination system 13 illuminates the driving environment without blinding drivers in approaching vehicles, since the NIR light is not visible to the human eye.

The light source may comprise a NIR diode laser. In one embodiment, the light source is a single stripe diode laser, model number S-81-3000-C-200-H manufactured by Coherent, Inc. of Santa Clara, Calif. The laser light source is capable of pulsed emission with a pulse width ranging from a few milliseconds for normal operation to a pulse width of several nanoseconds, i.e., 10–20 ns, for distance-specific imaging. The light source may be disposed in a housing 12. Further, the coupler 17 may be a fiber-optic cable, in which case, the NIR light source 14 may be connected to a first end of the fiber optic cable using a light coupler (not shown) as known by those skilled in the art. A second end of fiber optic cable is operatively disposed adjacent to the thin sheet optical element (not shown). Alternatively, the light source could be directly coupled to the thin-sheet optical element through a rigid connector, in which case the coupler would be a simple lens or reflective component. Although the system 10 preferably utilizes a NIR laser light source, an alternate embodiment of system 10 may utilize another type of NIR light source, as long as it is capable of pulsed operation, in lieu of the infrared diode laser.

Although the optic may be in the form of a thin sheet optical element, it may also be in some other form. Also, although a single optic is shown, additional optics may be incorporated within the illumination system 13 to form a desired beam pattern onto a target external from the vehicle 50.

The optic 16 may be formed of plastic, acrylic, or of some other similar material known in the art. The optic 16 can utilize the principle of total internal reflection (TIR) and form the desired beam pattern with a series of stepped facets (not shown). An example of a suitable optical element is disclosed in U.S. Pat. No. 6,422,713 entitled "Thin-Sheet Collimation Optics For Diode Laser Illumination Systems For Use In Night-Vision And Exterior Lighting Applications".

The receiver system 15 includes a receiver 20, a filter 22, and a receiver system controller which may be the same as system controller 11.

The receiver 20 may be in the form of a charge-coupled device (CCD) or a complementary metal oxide semiconductor (CMOS) camera. Both such devices make use of a pixel array and, preferably, a mega-pixel array for imaging as will be discussed in detail below. A camera, such as Model No. Wat902HS manufactured from Watec America Corporation of Las Vegas, Nev. may, for example, be used as the receiver 20. Near infrared light reflected off objects is received by the receiver 20 to generate an image signal.

Light emitted by the illumination subsystem 13 is reflected off the object 24 and the environment and is received by the NIR-sensitive receiver 20 to generate an image signal. The image signal is transmitted to the controller 11 or directly to the display module 30 where it is processed and displayed to allow the vehicle operator to see the object 24. The display 30 may be a television monitor, a CRT, LCD, or heads up display positioned within the automotive vehicle 50 to allow the user to see objects illuminated by the system 10.

The filter 22 is used to filter the light entering the camera. The filter 22 may be an optical band-pass filter that allows light, within a near infrared light spectrum, to be received by the receiver 20. The filter 22 may correspond with wavelengths of light contained within the illumination signal 60. The filter 22 prevents blooming caused by the lights of oncoming vehicles or objects. The filter 22 may be separate from the lens 19 and the receiver 20, as shown, or may be in the form of a coating on the lens 19 or a coating on a lens of the receiver 20, when applicable. The filter 22 may be a multistack optical filter located within the receiver 20.

In an embodiment of the present invention, the center wavelength of the filter 22 is approximately equal to an emission wavelength of the light source 14 and the filter full-width-at-half-maximum is minimized to maximize rejection of ambient light. Also, the filter 22 is positioned between a lens 19 and the receiver 20 to prevent the presence of undesirable ghost or false images. When the filter 22 is positioned between the lens 19 and the receiver 20 the light received by the lens 19 is incident upon the filter 22 over a range of angles determined by the lens 19.

The receiver controller 11 may also be microprocessor based, be an application-specific integrated circuit, or be formed of other logic devices known in the art. The receiver controller 11 may be a portion of a central vehicle main control unit, an interactive vehicle dynamics module, a restraints control module, a main safety controller, or it may be combined into a single integrated controller, such as with the illumination controller 11, or may be a standalone controller.

The display 30 may include a video system, an audio system, a heads-up display, a flat-panel display, a telematic system or other indicator known in the art. In one embodiment of the present invention, the display 30 is in the form of a heads-up display and the indication signal is a virtual image projected to appear forward of the vehicle 50. The display 30 provides a real-time image of the target area to increase the visibility of the objects during relatively low visible light level conditions without having to refocus ones eyes to monitor a display screen within the interior cabin of the vehicle 50.

The night vision system 10 adapts in response to input from sensors 33 which include vehicle speed sensors and vehicle directional sensors. Vehicle speed sensors input the vehicle speed into controller 11. The vehicle speed input can be generated by any known method. Vehicle directional data can be provided by a GPS system, accelerometer, steering sensor, or turn signal activation. The relative change in direction or potential change in direction is of primary concern for panning the system FOV as described in more detail below with regard to FIG. 4.

Referring now to FIG. 2, a block diagrammatic top view of the host vehicle 50, utilizing the vision system 10 and approaching an oncoming vehicle 80, is shown in accordance with an embodiment of the present invention. The illumination pattern 60 for the illumination system 13 is shown. The receiver system 15 has an associated field of view (FOV) for detecting objects illuminated by the illumination system 13. The widest FOV for the receiver approximately covers the same area as the illumination pattern 60, although it can be wider or more narrow than the illumination pattern. When the receiver system 15 employs a silicon-based charge-coupled device (CCD) or complementary metal oxide semiconductor (CMOS) camera as the receiver 20, the focal plane array detector of the camera captures the illuminated scene for image processing. Current video chip technologies employ mega-pixel arrays with very high resolution. The resolution of the display 30, however, is limited by the much lower resolution display, such as the heads-up display. As a result, portions of the focal plane array can be utilized or "zoomed-in," while maintaining the same apparent resolution on the vehicle display. By employing real-time software in the display or receiver controller 11, the present invention thus provides an adjustable or adaptable FOV without resolution degradation.

Figure 3:
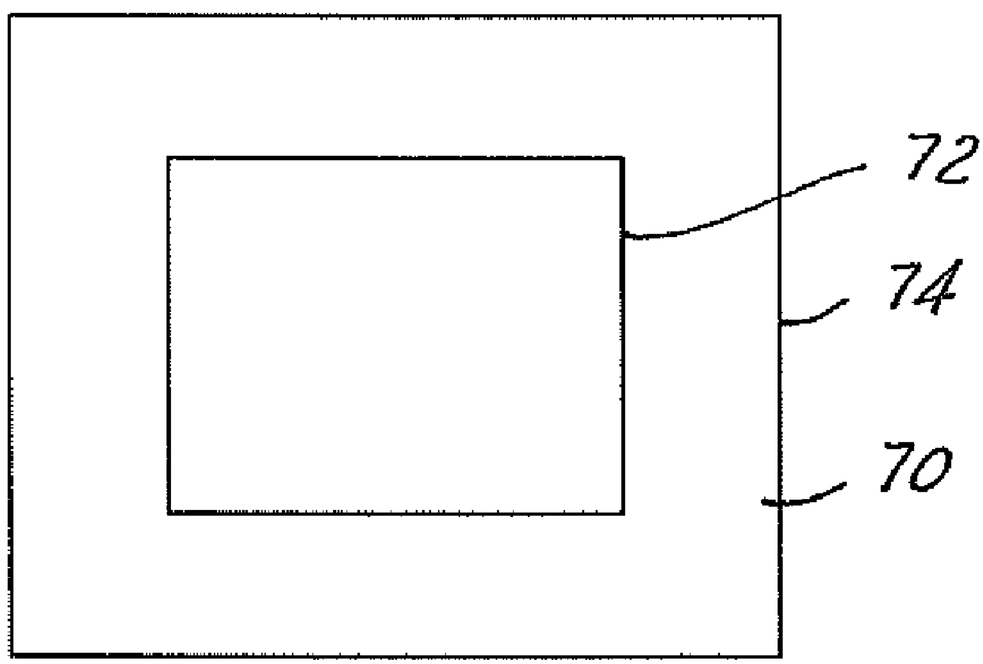
FIG. 3 is a block diagrammatic view of the pixel array for the receiver of FIG. 1.

Referring now to FIG. 3, there is shown a block diagrammatic view of the pixel array 70 associated with the receiver 15 and, in particular, the camera 20. The entire area of the pixel array 70 represents the maximum FOV for the camera 20 and may be commensurate with the horizontal angular FOV represented by angle A in FIG. 2. At higher speeds, however, it is desired to narrow the FOV for the imaging system. Thus, at higher speeds, only a portion of the array 70 is used to display an image to the vehicle operator. The area 72, for example, represents a "zoomed-in" pixel area for processing and display. As mentioned above, because the array 70 has a much higher resolution than the display 30, the system permits digital zooming of the FOV without any consequent degradation in the displayed image.

In one example, at low speeds, an 18° horizontal FOV is provided. This is represented as angle A in FIG. 2, and pixel array area 74 in FIG. 3. At relatively high speeds, the night vision systems adapts to a 10–11° horizontal FOV represented by angle B of FIG. 2 and zoomed-in pixel area 72 of FIG. 3. The receiver system 15 of the present invention is fixed and aligned to project along the vehicle axis in the forward direction of the vehicle 50. The illumination system 13 and receiver system 15 can be coaxially aligned centrally with regard to the vehicle, as shown, or with regard to the vehicle operator. Alternatively, the illumination system 13 and receiver system 15 can be offset with regard to each other with one system centrally located and one aligned with the vehicle operator's point of view.

Figure 4:
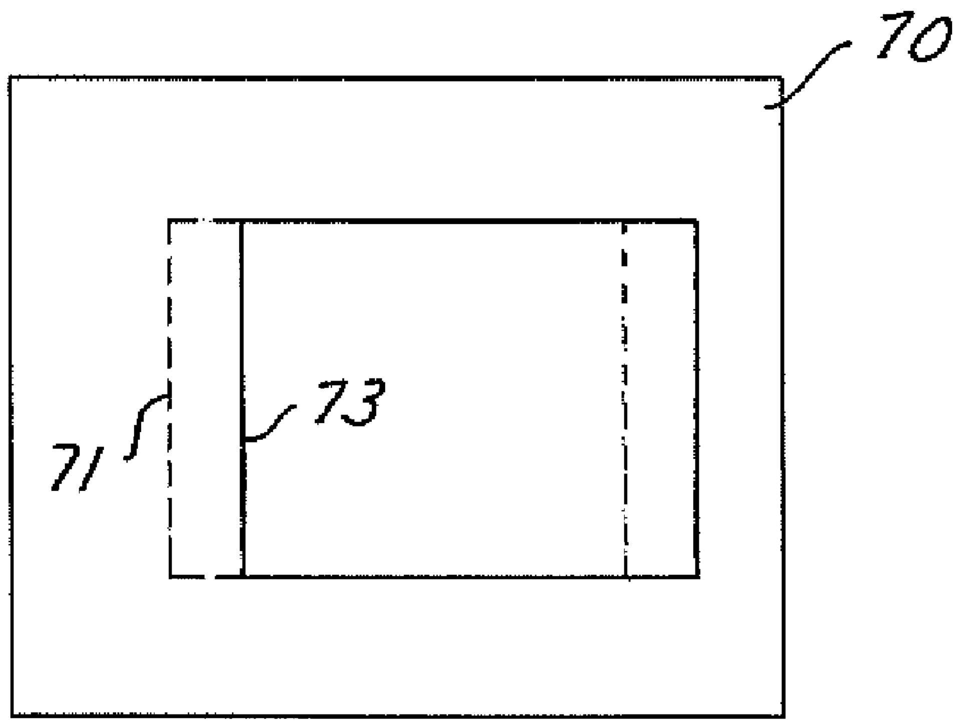
FIG. 4 is a block diagrammatic view of the pixel array of FIG. 3 according to another embodiment of the present invention.

Referring now to FIG. 4, there is shown a block diagrammatic view of the pixel array 70 and the active pixel areas 71, 73 during normal operation and directionally adaptive operation, respectively. While the vehicle is traveling relatively straight, the system FOV is forward looking as represented by pixel area 71 and horizontal angle A, for example, of FIG. 2. During a turn to the right, in this case, the system shifts the active pixel area 73 to the right to provide the operator with enhanced imaging in the direction of anticipated or actual vehicle heading. The corresponding angular FOV of the system may be represented by angles C, D or E of FIG. 2 depending upon the vehicle speed and degree of directional change. Angle C may represent a relatively low speed actual or anticipated moderate turn to the right. Angle E represents a low speed hard right turn, and angle D represents a high-speed right-hand curve, for example. The same principles would apply for a left-hand actual or anticipated directional change.

Actual directional information is provided by vehicle sensors 33 such as a GPS system, accelerometer, wheel angle sensor and/or steering wheel sensor. Anticipated directional data is supplied, for example, by the turn signal indicator.

Figure 5:
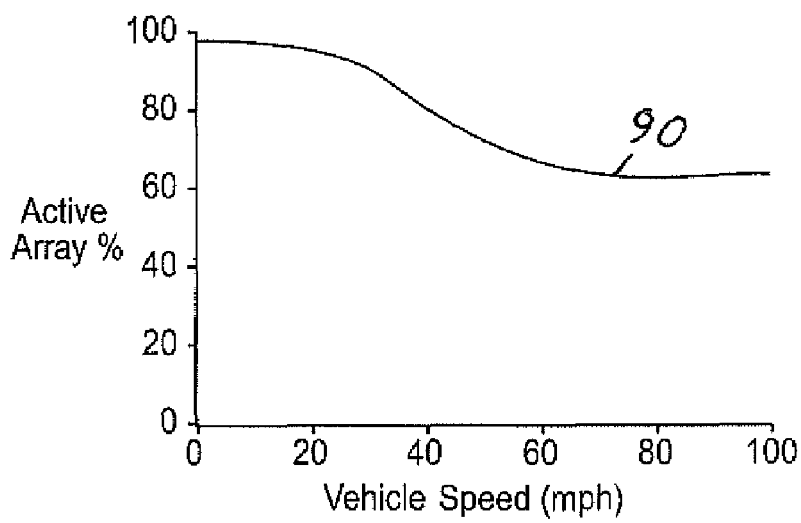
FIG. 5 is a graph of the adaptive field of view versus vehicle speed for the system of FIG. 1.

Referring now to FIG. 5, there is shown a graph of the adaptive FOV versus vehicle speed for the receiver system 15. The graph shows a smooth transfer function 90 implemented in the controller 11 to set the active pixel area as a function of vehicle speed. A smooth non-linear transition between low and high speed is implemented to prevent any abrupt changes in the system FOV displayed to the vehicle operator to prevent distraction. Below a certain speed, such as 30 mph, for example, the percentage of active pixel array area is relatively constant, and high, i.e., near 100%. Likewise, above a certain speed such as 60 mph, for example, the percentage of active pixel array area is relatively constant, and low, i.e., approximately 60%. Between these two predetermined speed thresholds, the percentage of active pixel array area changes approximately linearly, although it can also be set to adjust nonlinearly.

Figure 6:
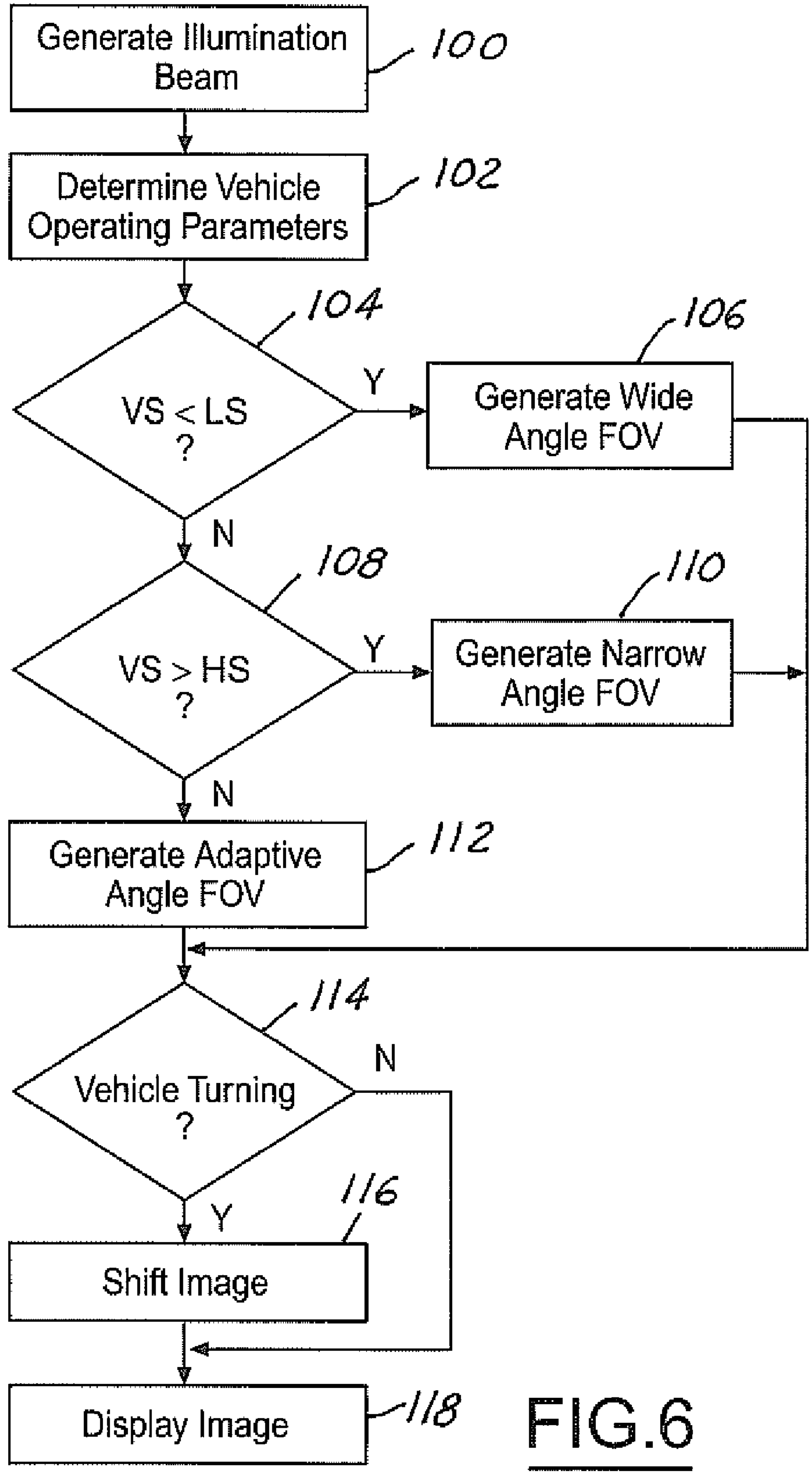
FIG. 6 is a logic flow diagram illustrating one method of operating a night vision system in accordance with an embodiment of the present invention.

Referring now to FIG. 6, there is shown a logic flow diagram illustrating one method of operating a night vision system in accordance with an embodiment of the present invention. In step 100, the illumination system 13 is activated at a duty cycle and generates the illumination beam 60 to illuminate the desired region forward of the vehicle 50. The duty cycle can be from 0–100% but, in most applications will probably be from 20–50%.

In step 102, the vehicle operating parameters are determined. These can include the vehicle speed, vehicle direction or anticipated vehicle direction as discussed above.

The vehicle speed value may represent a threshold value for zooming or panning the image to be displayed. Thus, for example, if the vehicle speed (VS) is less than the low speed threshold (LS), the entire wide-angle view (i.e., 18° FOV) will be displayed to the vehicle operator. This is represented by steps 104 and 106.

Similarly, in steps 108, 110, if the vehicle speed (VS) exceeds a high-speed threshold (HS) such as 60 mph, the receiver system will collect image data only from that portion of the pixel array representing a narrow angle FOV (i.e., 10–11° FOV). Otherwise, in step 112, an adaptive angle FOV is generated as a function of the vehicle speed. This can be a linear or non-linear function depending upon the threshold values set for LS and HS. The low and high-speed thresholds can also be set at extremes such as LS=0 and HS=200 such that the FOV angle can be adaptive across all relevant vehicle speeds.

Optionally, in step 114, the vehicle directional heading or anticipated directional heading can be taken into account. Thus, depending upon the magnitude of the directional change as indicated by, for example, vehicle speed and steering wheel angle, the active portion of the receiver pixel array can be shifted as discussed above with regard to FIG. 4. Again, the amount of image shift can be linearly related to the magnitude of directional change or non-linear. Upper and lower thresholds can also be used, as above, to eliminate operator distraction resulting from a constantly changing image shift. If any image shift is employed, it is implemented in step 116. The resulting active pixel array area is then displayed in step 118 to the vehicle operator.

While the invention has been described in connection with one or more embodiments, it is to be understood that the specific mechanisms and techniques which have been described are merely illustrative of the principles of the invention, numerous modifications may be made to the methods and apparatus described without departing from the spirit and scope of the invention as defined by the appended claims.

What is claimed is:

1. A vision system for a vehicle comprising:

a light source generating an illumination beam;

a receiver having a pixel array for capturing an image in response to at least a reflected portion of said illumination beam, said image corresponding to a first horizontal field of view (FOV) angle; and a controller coupled to said light source and said receiver and receiving a vehicle speed input, said controller selecting a portion of said image as a non-linear function of said vehicle speed to generate a second horizontal FOV angle for displaying to the vehicle operator, wherein the second FOV angle is the same as the first FOV angle up to a low speed (LS) threshold value.

2. A vision system according to claim 1 wherein said receiver is a CMOS or CCD camera.

3. A vision system according to claim 1 wherein said light source is a non-incandescent light source.

4. A vision system according to claim 1 wherein the second FOV angle decreases with respect to the first FOV angle as the vehicle speed increases.

5. A vision system according to claim 1 wherein the second FOV angle decreases with respect to the first FOV angle as the vehicle speed increases between said LS threshold value and a high speed (HS) threshold value.

6. A vision system according to claim 5 wherein the second FOV angle is fixed at a smaller angle with respect to the first FOV angle beyond the HS threshold value.

7. A vision system according to claim 6 wherein the LS threshold value is less than or equal to 30 mph and the HS threshold value is greater than or equal to 50 mph.

8. A vision system according to claim 6 wherein the second FOV angle is between 5–15° when the vehicle speed is above the HS threshold value.

9. A vision system according to claim 1 wherein the second FOV angle is between 10–30° when the vehicle speed is below the LS threshold value.

10. A vision system according to claim 1 comprising a display for displaying said image corresponding to said second FOV angle to the vehicle operator.

11. A vision system according to claim 10 wherein said display is a heads-up-display.

12. An active night vision system for a vehicle comprising:

a light source generating an illumination beam;

vehicle sensors for indicating first and second vehicle operating parameters;

a receiver having a pixel array for capturing an image in response to at least a reflected portion of said illumination beam, said image corresponding to a first horizontal field of view (FOV) angle; and a controller coupled to said light source, said receiver and said vehicle sensors, said controller selecting a portion of said image as a non-linear function of said first vehicle operating parameter and said second vehicle operating parameter to generate a second horizontal FOV angle for displaying to the vehicle operator, wherein said second horizontal FOV angle is the same as the first horizontal FOV angle up to a first threshold value related to said first or second vehicle operating parameters.

13. An active night vision system according to claim 12 wherein said receiver is a CMOS or CCD camera.

14. An active night vision system according to claim 12 wherein said first vehicle operating parameter is vehicle speed and said second vehicle operating parameter is vehicle change of direction.

15. An active night vision system according to claim 14 wherein the second FOV angle decreases with respect to the first FOV angle as the vehicle speed increases.

16. An active night vision system according to claim 14 wherein the second FOV angle shifts with respect to the first FOV angle in the same direction as the vehicle change of direction.

17. An active night vision system according to claim 15 wherein the second FOV angle shifts with respect to the first FOV angle in the same direction as the vehicle change of direction.

18. An active night vision system according to claim 12 comprising a display for displaying said image corresponding to said second FOV angle to the vehicle operator.

19. An active night vision system according to claim 18 wherein said display is a heads-up-display.

* * * * *